(12) United States Patent
Cartrette et al.

(10) Patent No.: US 11,229,108 B2
(45) Date of Patent: *Jan. 18, 2022

(54) METHODS AND APPARATUS FOR PROVIDING DC POWER FOR LOW VOLTAGE LIGHTING

(71) Applicant: The Watt Stopper, Inc., Carlsbad, CA (US)

(72) Inventors: Jonathan P. Cartrette, Carlsbad, CA (US); Jeffrey T. Davis, Carlsbad, CA (US)

(73) Assignee: The Watt Stopper, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/983,886

(22) Filed: Aug. 3, 2020

(65) Prior Publication Data

US 2020/0367349 A1 Nov. 19, 2020

Related U.S. Application Data

(63) Continuation of application No. 16/677,511, filed on Nov. 7, 2019, now Pat. No. 10,743,395, which is a continuation of application No. 16/373,094, filed on Apr. 2, 2019, now Pat. No. 10,477,658, which is a continuation of application No. 15/914,475, filed on Mar. 7, 2018, now Pat. No. 10,251,248, which is a continuation of application No. 15/294,529, filed on Oct. 14, 2016, now Pat. No. 9,918,373.

(60) Provisional application No. 62/241,621, filed on Oct. 14, 2015.

(51) Int. Cl.
*H02J 1/10* (2006.01)
*H05B 47/185* (2020.01)
*H02J 4/00* (2006.01)
*H02J 5/00* (2016.01)
*H02J 3/00* (2006.01)
*H05B 47/19* (2020.01)

(52) U.S. Cl.
CPC ............ *H05B 47/19* (2020.01); *H02J 1/10* (2013.01); *H02J 3/00* (2013.01); *H02J 4/00* (2013.01); *H02J 5/00* (2013.01); *H05B 47/185* (2020.01)

(58) Field of Classification Search
CPC ...... H01L 2224/73265; H05B 33/0815; H05B 33/0803; H05B 33/089; H05B 33/0821; H05B 33/0842; H05B 33/0896; H05B 33/0809; H05B 33/0845; H05B 33/0884; H05B 33/0887; H05B 37/0254; H05B 37/0263; H05B 37/0272; H05B 47/19; H05B 47/185; H05K 2201/10106; H02J 1/10; H02J 3/00; H02J 4/00; H02J 5/00
See application file for complete search history.

(56) References Cited

U.S. PATENT DOCUMENTS 10,306,740 B1 * 5/2019 Wu .................. H05B 47/115

* cited by examiner

*Primary Examiner* — Vibol Tan
(74) *Attorney, Agent, or Firm* — Crockett & Crockett, PC; K. David Crockett, Esq.; Niky Economy Syrengelas, Esq.

(57) ABSTRACT

A DC power supply for lighting includes low voltage driver electronics for any suitable load such as lighting along with a supervisory controller that communicates to the driver electronics via any suitable digital communication protocol. Each driver's output ports include a 3rd wire that communicates to the low voltage load fixture for the purpose of auto-negotiating the appropriate power level without first having to energize the fixture.

6 Claims, 3 Drawing Sheets

METHODS AND APPARATUS FOR PROVIDING DC POWER FOR LOW VOLTAGE LIGHTING

This application is a continuation of U.S. application Ser. No. 16/677,511, filed Nov. 7, 2019, which is a continuation of U.S. application Ser. No. 16/373,094, filed Apr. 2, 2019, now U.S. Pat. No. 10,477,658, which is a continuation of U.S. application Ser. No. 15/914,475 filed Mar. 7, 2018, now U.S. Pat. No. 10,251,248, which is a continuation of U.S. application Ser. No. 15/294,529 filed Oct. 14, 2016, now U.S. Pat. No. 9,918,373, which claims priority to U.S. Provisional Application 62/241,621 filed Oct. 14, 2015.

FIELD OF THE INVENTIONS

The inventions described below relate to the field of low voltage lighting.

BACKGROUND OF THE INVENTIONS

Current negotiated power standards lack a requirement for a standby power level to be available such that the load device can turn on active electronics and respond via a full communication stack.

SUMMARY

The devices and methods described below provide for a DC power supply for loads such as lighting. The DC power supply includes low voltage lighting driver electronics along with a supervisory controller that communicates to the driver electronics via any suitable digital communication protocol. The output of each low voltage lighting port includes a third wire that communicates to the low voltage lighting fixture for the purpose of auto-negotiating the appropriate power level without first having to energize the fixture.

The DC power supply housing includes light emitting diode (LED) driver electronics along with a supervisory controller that communicates the driver electronics via digital method such as the digital addressable lighting interface (DALI). LED constant current or constant voltage style signals are then originated to LED fixture assemblies that contain no drivers of their own; only LED arrays manufactured by others using any suitable means.

Through the use either of a backplane circuit board or wiring harnesses each driver's output ports include a 3rd wire that communicates to the LED fixture for the purpose of auto-negotiating the appropriate power level without first having to energize the fixture. This allows fixture brands and types to be mixed and even moved from port to port without the risk of damage to the fixture or requiring expertise by the installer to understand how to balance (i.e. bias) LED array power levels for optimal output.

Optionally, driver manufacturer's would be allowed to license the methodology such that their driver could perform the auto-negotiation on its own. Second, the housing could optionally implement a method where LED drivers' form factors are modified by the manufacturer to include additional input pins either in the form of discrete connectors or card-edge connector format such that inclusion in a particular slot sets the bus address for communicating to the master controller in the housing. An example being if the LED drivers in each slot were DALI slaves, slot 1 would take bus address 1, slot 2 bus address 2, etc. such that the master controller could address each slot individually without requiring a technician to intervene by supplying individual bus addresses as is required to individually address DALI drivers or ballasts mounted directly in fixtures. An additional benefit is now that each slot could be purpose chosen based on price, performance, brand, or other factors even allowing the installing contractor, facility maintenance professional, or specifier to call out different capabilities for each output channel without impacting their choice in fixture form factor, aesthetics, CRI, or other similar factors. The LED fixtures, in effect, become as interchangeable as incandescent lamps.

The devices and methods described below:
1. Remove cost from LED fixtures;
2. Remove UL certification cycle from LED fixtures;
3. Removes LED driver control performance specification from fixture manufacturer;
4. Prevents damage to LED fixtures when swapping out driver technologies;
5. Allows mix and match or field comparison of driver performance with a given fixture;
6. Reduces LED drivers to a single standard form factor;
7. Reduces the number of global controller addresses and/or radios for per-fixture control schemes from 1:fixture to 1:housing-diversity (likely models are 4 slot, 8 slot, 16 slot, 32 slot) thus reducing commissioning and re-commissioning times;
8. Reduces UL certification "pairing" cycles for drivers from 1:fixture (potentially 10,000's) to 1:housing-diversity (likely models are 4 slot, 8 slot, 16 slot, 32 slot);
9. Added efficiency through the ability to bulk-power a housing through a single large AC/DC conversion or DC/DC conversion;
10. Added safety through allowing DC class 2 wiring to fixtures;
11. Added safety through having LED driver assemblies of whatever form factor in a cavity/barrier scheme that isolates high voltage connections from service personnel more effectively than a fixture housing;
12. Long term serviceability improvement by allowing potentially EOL or expensive drivers to be easily field replaced without fear of damaging the fixture.

DETAILED DESCRIPTION OF THE INVENTIONS

Figure 1:
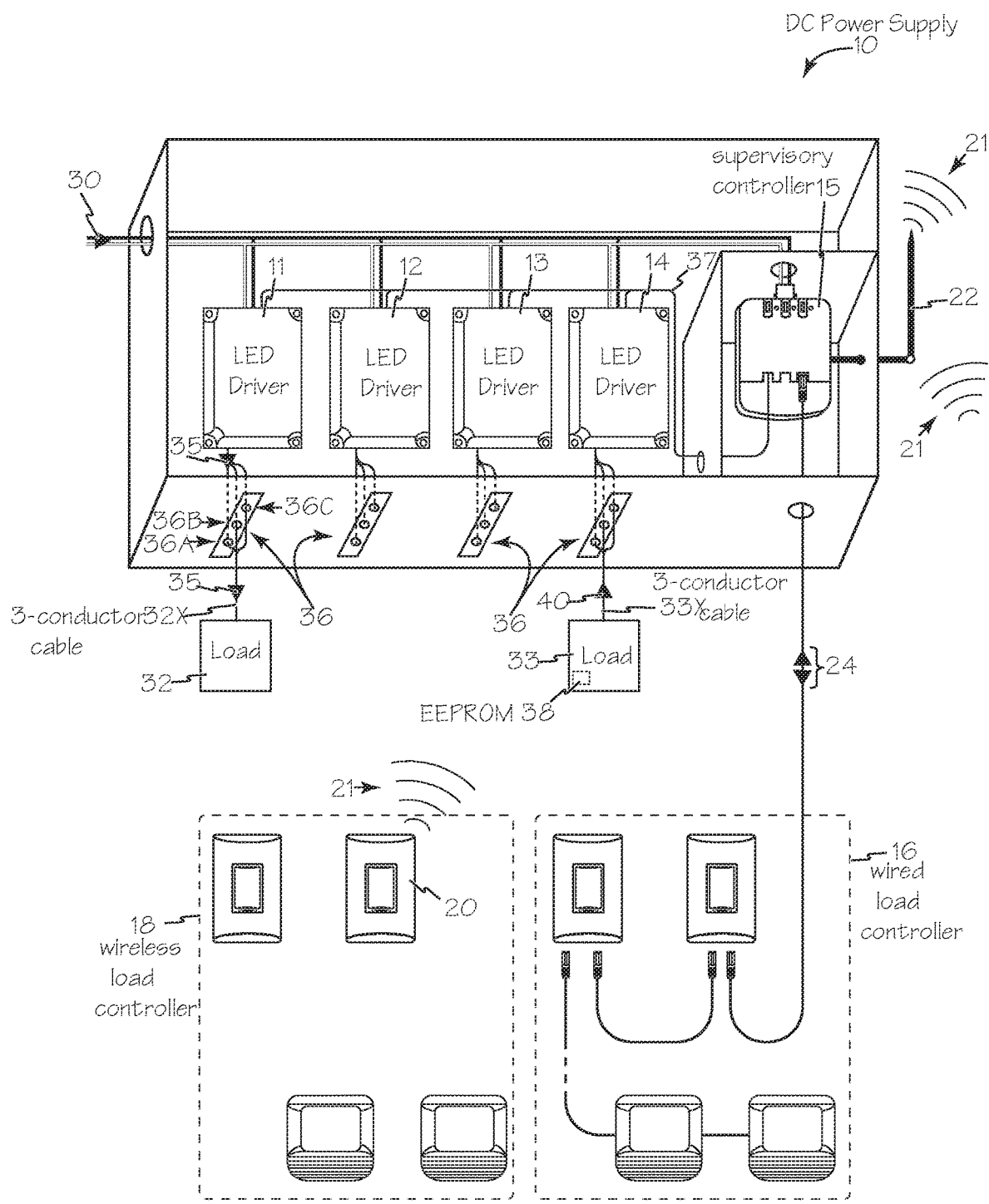
FIG. 1 is a block diagram of a low voltage lighting power housing.

DC power supply 10 illustrated in FIG. 1 includes one or more LED drivers, such as DC or LED drivers 11, 12, 13 and 14 along with a supervisory controller 15 that communicates with the LED drivers via any suitable method such as digital communications, for example using DALI. Supervisory controller 15 is capable of receiving wired or wireless communication from wired load controllers 16 and wireless load controllers 18 communicating control accessories such as motion detectors, switch stations, ambient light sensors, occupancy sensors and other load controllers. For example wireless load controller 20 exchanges wireless communication signals 21 via antenna 22. Similarly, wired load controllers 16 exchange control signals 24 with supervisory controller 15.

Any suitable line voltage energy 30 is shared within power supply 10 to provide energy for supervisory controller 15 and LED drivers 13-15. The LED drivers are optimized power supply units for any suitable load such as lighting loads 32 and 33 and they provide drive signals or energy 35 using either constant voltage pulse width modulation or constant current topology. LED constant current or constant voltage style signals 35 are then distributed to the loads such as LED fixture assemblies that contain no drivers of their own. Suitable lighting loads can be simple LED arrays manufactured by others using any suitable means.

Loads 32 and 33 may be any suitable DC load such as an array of LEDs. Loads 32 and 33 are connected to output connectors of power supply 10 using cables with at least three conductors such as cables 32X and 33X respectively. By using power supply 10 with its included LED drivers, loads 32 and 33 do not require integrated LED drivers and are understood to be driverless loads.

Figure 2:
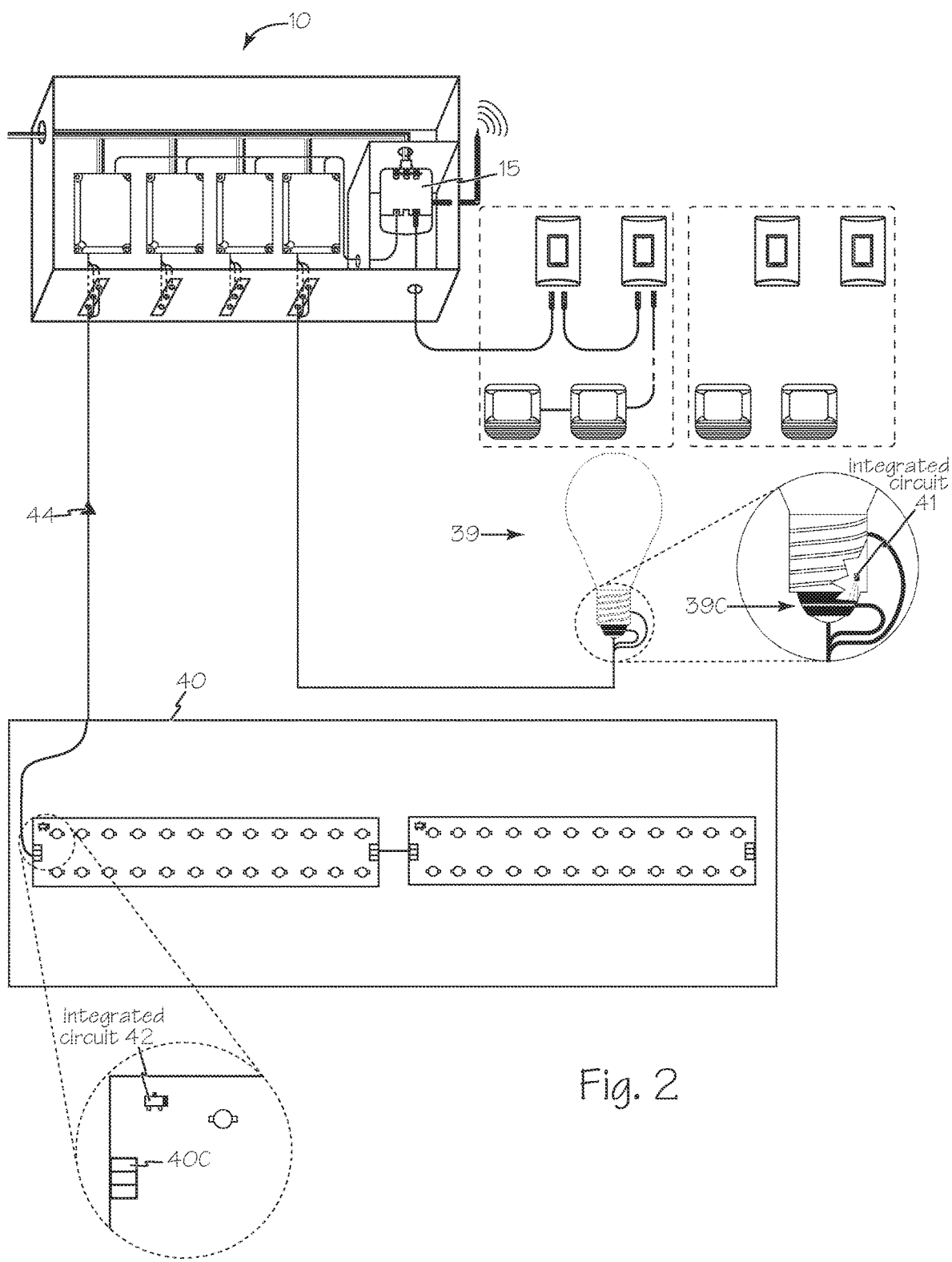
FIG. 2 is an illustration of the details of the wired terminal connections of the low voltage lighting power housing of FIG. 1.

DC power supply 10 includes power output connectors 36 having at least three conductors, pins, sockets or terminals such as terminals 36A, 36B and 36C. Terminals 36A and 36B conduct the hot or power signal and the common or ground signal for powering the load such as the LED array. Terminal 36C is the connection between supervisory controller 15 and the loads via wiring harness 37 through the LED drivers to communicate with the load or, more specifically, in some cases with a communications chip such as an EEPROM 38 incorporated into the load as illustrated in FIGS. 1 and 2. Driverless loads such as loads 32 and 33 of FIG. 1 or loads 39 and 40 of FIG. 2 incorporate a third terminal such as terminals 39C or 40C respectively in their power connector for the purposes of receiving communication from the master or supervisory controller.

Any suitable electronic communicating integrated circuit capable of communicating over a single wire may be incorporated in each load such as chips 41 and 42. such as the Dallas 1-wire standard from Maxim electronics included at manufacture from the light source OEM and containing an alphanumeric string encoding the power requirements to safely operate the LED light source for the purpose of allowing the coordinating controller to query the power requirement of the connected light source at each 1) power cycle, 2) plug in, and 3) unplug/re-plug event such that power delivery is always appropriate for the connected LED light source to make the DC system self-biasing (e.g. balanced) without the need for a fixed prior configuration.

Figure 3:
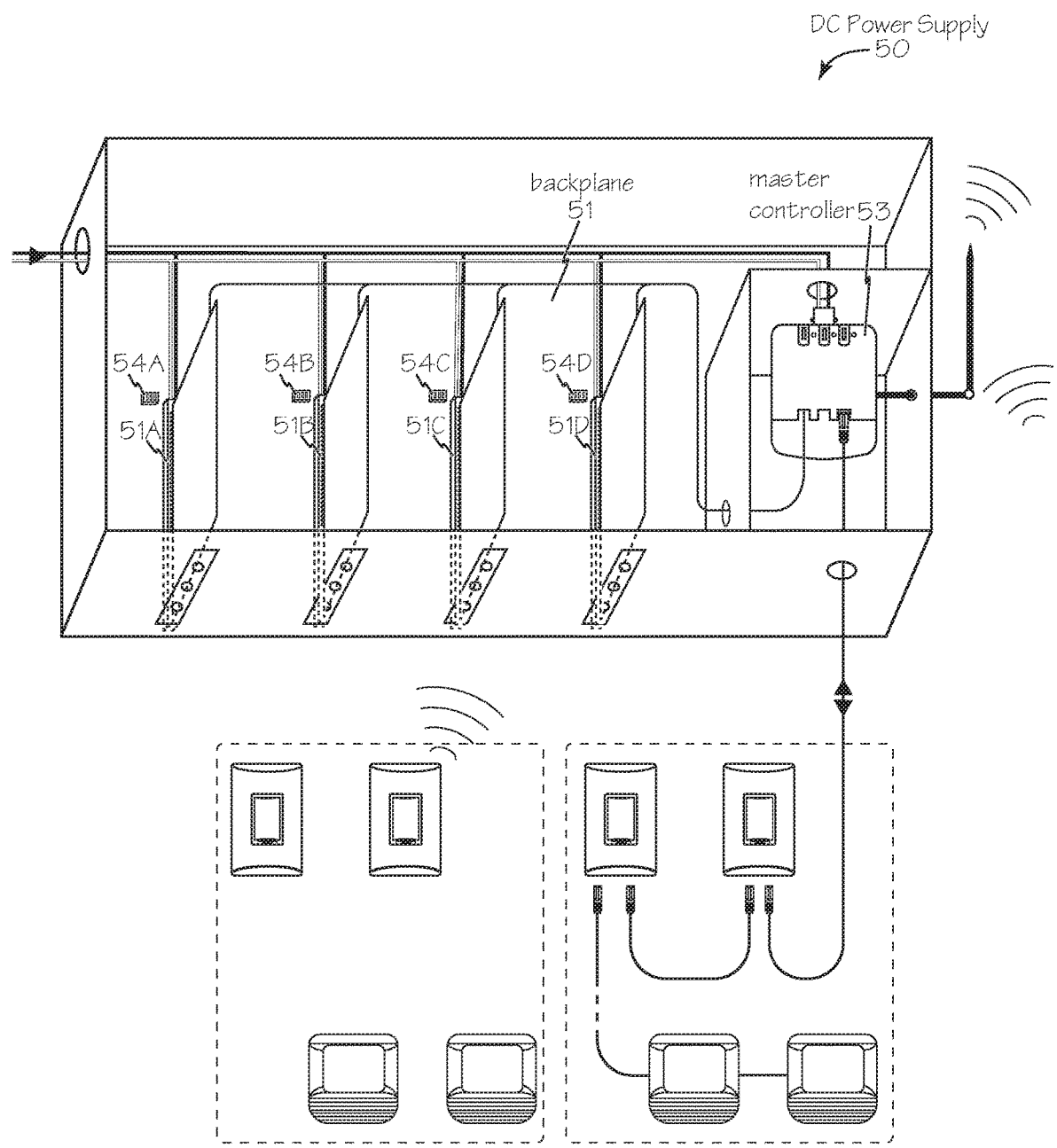
FIG. 3 is a block diagram of an alternate low voltage lighting power housing.

Through the use either of a backplane circuit board as illustrated in FIG. 3 or with a wiring harnesses such as wiring harness 37 illustrated in FIG. 1 or 2, the output port of each of LED drivers 11-14 includes a 3rd wire that communicates to the LED fixture (load) and the supervisory controller 15 for the purpose of auto-negotiating the appropriate power level without first having to energize the fixture. This allows fixture brands and types to be mixed and even moved from port to port without the risk of damage to the fixture from an improperly balanced driver or requiring expertise by the installer to understand how to balance (i.e. bias) LED array power levels for optimal output.

The method of auto-negotiating shall be implemented using any suitable technique such as by transmitting a data set or packet such as a simple encoded string from the LED array (load). For example, data packet 44 includes the required voltage and current levels of load 33 to supervisory controller 15 such that the supervisory controller can distribute the information to the drivers.

Optionally, driver manufacturer's would be allowed to license the methodology such that their driver could perform the auto-negotiation on its own.

A power supply such as power supply 10 illustrated in FIGS. 1 and 2 or power supply 50 of FIG. 3 may also be used to charge one or more batteries where the voltage and current needs can be known and included on the 1Wire EEPROM for the charger output to read before engaging. For example, a 6V cell for exit sign needs 7.2V @ 400 mA to charge whereas a 24V cell for light fixture needs 29V @ 500 mA to charge, but the same channel could support both for charging purposes by first reading back the charging input required. Other related charging system applications are include appliance devices such as cordless/cell phone, handheld power tools, etc.

The devices and methods as described may also include wired low power commercial ceiling accessory devices which could also auto-negotiate for their required accessory voltage safely by including the EEPROM and 3rd wire connector. Examples include HVAC devices such as VAV controllers, IO controllers, controllable shade motors, electro-chromic glass controller, or controllable skylight dampers.

The devices and methods as described may also include wired-for-power but wireless-for-communication devices of any kind where communication via an unsecured connection such as USB or via an expensive per port tech like PoE is not optimal with examples including wall mounted touch screen controllers, thermostats, and digital RF communicating light switches.

The devices and methods as described may also include the power supply as discussed above supporting a connector, wiring harness, or socket enabling the in-field addition of a programmed EEPROM with the power negotiation parameters for a device type that did not include the chip from the factory or vendor that chose not to factory-include the capability.

The low voltage lighting system uses power auto-negotiation technology circuit such as Maxim-IC Dallas 1-wire or similar. The low voltage lighting driver housing uses standard commercial-off-the-shelf (COTS) LED drivers that are factory or in-field wired to the output ports and the master controller.

An alternate power supply is illustrated in FIG. 3. Power supply 50 incorporates backplane 51 and an industrial design method and form factor such that insertion of a low voltage lighting driver such as driver 52 into the backplane, or the socket of the backplane such as socket 51A, sets a communication bus address such that master controller 53 can automatically address driver 52.

For example, if the LED drivers in slots 51A, 51B, 51C and 51D were DALI slaves, slot 51A would take bus address 1, slot 51 bus address 2, etc. such that master controller 53 could address each slot individually without requiring a technician to intervene by supplying individual bus addresses as is required to individually address DALI drivers or ballasts mounted directly in fixtures. An additional benefit is now that each load and driver could be purpose chosen based on price, performance, brand, or other factors even allowing the installing contractor, facility maintenance professional, or specifier to call out different capabilities for each output channel without impacting their choice in fixture form factor, aesthetics, CRI, or other similar factors.

Alternatively, the addresses of slots in the backplane such as slots 51A, 51B, 51C and 51D may have their binary addressing set for each slot by means of pins pulled high or low via dip switches or other discrete components on the backplane, such as dip switches 54A, 54B, 54C and 54D for the purpose of automatically addressing the DALI communication to each slot automatically so that LED drivers can be easily mixed, matched, and moved to different slots without affecting the ability of the master controller to address each slot individually.

Master or supervisory controllers such as controllers 15 and 53 have a global network connection, lighting control algorithm, DALI master, DALI slave, I2C/SPI, and UART/Serial connections for connection to LED drivers or a backplane.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A method of providing DC power to a driverless load comprising:

providing a power supply comprising a supervisory controller operably connected to line power and a DC driver operably connected to line power and the supervisory controller;

providing means for embedding an integrated circuit for communication in the driverless load and operably connecting the DC driver to the driverless load;

conducting energy and communication between the power supply to the driverless load with data from the driverless load; and providing one or more load controllers operably connected to the supervisory controller for applying or removing energy to the load.

2. The method of claim 1 wherein the means for embedding an integrated circuit for communication is a circuit capable of communicating over a single wire.

3. The method of claim 1 further comprising providing a digital addressable lighting interface protocol to communicate between the supervisory controller and the DC driver.

4. The method of claim 1 wherein the supervisory controller communicates with the DC driver using a digital addressable lighting interface protocol.

5. The method of claim 1 wherein the DC driver energy to the driverless load using constant voltage pulse width modulation topology.

6. The method of claim 1 wherein the DC driver provides energy to the driverless load using constant current topology.

* * * * *